Aug. 21, 1934.                L. M. BEALL                1,971,026
                          ANTIFREEZING DEVICE
                          Filed Oct. 26, 1931

INVENTOR
Lloyd M Beall
BY
ATTORNEYS

Patented Aug. 21, 1934

1,971,026

UNITED STATES PATENT OFFICE 1,971,026

ANTIFREEZING DEVICE

Lloyd M. Beall, Dearborn, Mich.

Application October 26, 1931, Serial No. 571,022

1 Claim. (Cl. 137—71)

My invention relates to anti-freezing devices and more particularly to an anti-freezing device for water meters.

It is now the practice to provide a frangible bottom for the water meter casing, which in the event of freezing breaks to relieve the pressure and permit further expansion without injury to the parts of the recording mechanism. This practice in addition to being laborious is costly in that the broken bottom has to be replaced each time the water meter freezes.

With this objection in mind it is the principal object of the present invention to provide an anti-freezing device wherein expansion due to freezing is provided for without the use of a frangible or expansible bottom.

The invention further provides an anti-freezing device embodying a diaphragm arranged to provide an air or expansion chamber in the water meter casing so that when expansion occurs within the casing the diaphragm will be flexed into the air or expansion chamber and thereby relieve the bottom or other parts of the water meter from strain or breakage when the water therein becomes frozen.

It is another object of the invention to provide an anti-freezing device of this character, wherein the diaphragm serves the added purpose of a packing or water tight joint between the water meter casing and its bottom.

With the preceding and other objects and advantages in mind, the invention consists in the novel combination of elements, constructions and arrangement of parts and operations to be hereinafter specifically referred to, claimed and illustrated in the accompanying drawing, wherein—

Figure 1:
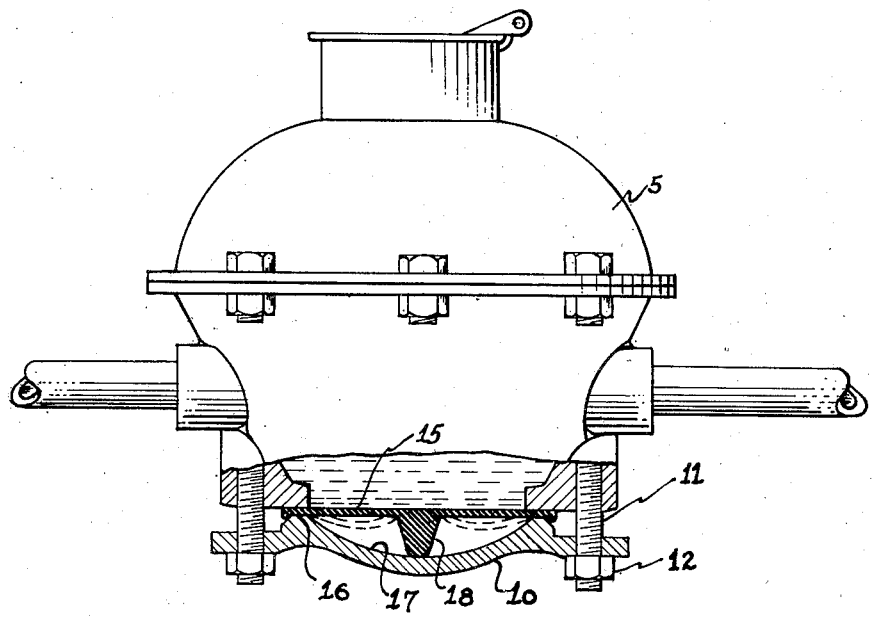
Figure 2:
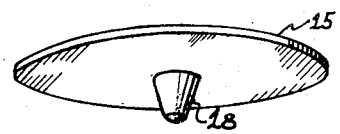

Figure 1 is a view partly in elevation and partly in section of a water meter equipped with my invention; and Fig. 2 is a perspective of the device removed from the water meter.

Referring to the invention in detail, a conventional globular water meter casing 5 having a concavo convex bottom 10 detachably held to the lower side of the casing 5 by the usual bolts 11 and nuts 12 is provided.

My invention provides a flexible diaphragm or circular gasket 15 formed of rubber or other suitable material which will not deteriorate by the action of water or metal. The diaphragm 15 overlies the concave face of the bottom 10 and is interposed between an annular shoulder 16 formed on the inner face of the bottom and the under face of the casing 5. It will be observed that the diaphragm extends beyond the shoulder 16 and is tightly clamped between the latter and casing 5 to provide a water tight joint by means of the bolts 11 and nuts 12. Moreover, this arrangement effectively holds the diaphragm so that it cannot be pulled out by the strain placed on the latter by the water and metering element (not shown) contained in the casing or housing 5.

As shown in Figure 1, the diaphragm 15 entirely encloses the concavity of the bottom so that the latter forms an air or expansion chamber 17 below the water contained in the casing or housing 5. In practice the diaphragm supports the metering element not shown and is subjected to the weight of the water contained in the casing or housing 5 and its natural tendency would be to sag. To overcome or reduce this condition, the under face of the diaphragm is formed with an inverted frusto-conical shaped protuberance 18 at its center which abuts the inner face of the bottom 10.

In the event that the water contained in the housing or casing 5 freezes, the expansion due to freezing exerts pressure on the diaphragm, causing the same to flex downwardly into the expansion chamber 17. By providing for the expansion or freezing of the water the delicate recording mechanism will not be strained and therefore cannot become damaged when freezing occurs.

What is claimed is:—

In combination, a water reservoir, a concavo-convex bottom detachably secured to said reservoir, said bottom having an annular shoulder, a flexible diaphragm overlying the concavo convex bottom with a portion thereof interposed between said annular shoulder and said reservoir, and an integral flexible protuberance formed on the under face of said diaphragm and normally engaging said bottom, said protuberance being of frustro-conical shape with the largest diameter thereof considerably smaller than said diaphragm whereby said diaphragm is permitted to flex on all sides of said protuberance.

LLOYD M. BEALL.